UNITED STATES PATENT OFFICE.

WILLIAM C. FERGUSON, OF GARDEN CITY, NEW YORK, ASSIGNOR TO NICHOLS COPPER COMPANY, OF NEW YORK, N. Y., A CORPORATION OF NEW YORK.

TREATMENT OF ELECTROLYTIC SLIMES.

1,305,788.    Specification of Letters Patent.    Patented June 3, 1919.

No Drawing.    Application filed November 19, 1918.  Serial No. 263,127.

*To all whom it may concern:*

Be it known that I, WILLIAM C. FERGUSON, a citizen of the United States, and a resident of Garden City, Nassau county, New York, have invented certain new and useful Improvements in the Treatment of Electrolytic Slimes, of which the following is a specification.

My invention relates particularly to the treatment of slimes such as those obtained in the electrolytic refining of metals, as, for instance, copper, though it may also be applied to others such as those obtained in the manufacture of blue vitriol and similar slimes or muds. These slimes generally contain gold, platinum, palladium, silver, copper, selenium, tellurium, arsenic, antimony, lead and silica in varying proportions and sometimes contain also traces of bismuth, nickel and iron.

The particular slime, to which the process is particularly applicable, is that resulting from the electrolytic refining of crude metallic copper, that is to say, bessemerized copper matte. An analysis of a typical sample of this material (in the dry state) is as follows:

| | |
|---|---|
| Copper | 27.47% |
| Silver | 16.97 |
| Gold | .39 |
| Selenium and tellurium | 10.40 |
| Arsenic | 1.72 |
| Antimony | .44 |
| Silica | 25. |
| Lead sulfate | 2. |
| Bismuth, nickel, iron, platinum, palladium, etc | Traces. |

In this sample, the copper was mostly in the form of metallic copper, the silver was probably mostly tellurid, and selenid, and the gold probably principally tellurid. The high silica content was due to the fact that the copper plates were cast in molds washed with finely ground silica. It plays no part in the chemistry of my process.

The object of my invention is to so treat slimes of the kind specified that the values, gold, silver and copper are extracted in a commercially practicable and economical manner. More particularly I aim to produce from the slimes—pure gold and silver and copper sulfate, (or metallic copper if preferred) while obviating the disadvantages of the usual method of refining the slimes to Doré bars, after removing the copper, and then parting the silver and gold by the electrolytic method.

The process of my invention is a modification of and an improvement upon, the process described in my co-pending application, Serial No. 259,852 re-allowed November 9, 1918. Instead of roasting the slime in the presence of a sulfatizing agent to the point where substantially all of the silver is converted into sulfate, and a relatively large part of the copper remains in the form of sulfate, and another, and relatively small, part remains in the form of oxid, in my improved process the roasting is conducted to a point where substantially all of the copper is oxidized and is then continued at a higher temperature until substantially all of the silver has been converted into silver sulfate, but only a small proportion of the copper has been converted into copper sulfate, the major portion remaining in the form of copper oxid. During this operation, as in the operation of which my process is an improvement, a considerable part of selenium and arsenic, and small amounts or traces of tellurium, lead and bismuth are volatilized from the slime, and the losses of precious metal values are extremely small. The metal values are then recovered from the roasted slime substantially in the manner described in my said application, Serial No. 259,852, namely by lixiviating or leaching with a suitable solvent for certain portions of the roasted slime (particularly the silver sulfate and copper sulfate) and thereafter extracting by suitable methods, the metal values contained in the leached residue.

The process described in my application, Serial No. 259,852 is substantially the following:

The mud is roasted at a suitable roasting temperature for instance at a temperature of from 500° C. to 600° C. in the presence of a sulfatizing agent such as sulfuric acid or a sulfate, such as copper sulfate or iron sulfate. The sulfatizing agent is employed in sufficient amount to sulfatize not merely the copper, but also the silver. The roasting is carried out in the presence of air—so that instead of the above compounds containing the sulfuric acid radical, any other compound such as sulfur dioxid or trioxid or a sulfid, as pyrites, which under the conditions will produce a compound containing such radical and will effect a sulfatizing action, may be used as sulfatizing agent. The roasting operation is designed to produce a substantially complete oxidation of the mud, and this may require a roasting period of about 20 hours. The roasting is so carried out, preferably, that substantially all of the silver is transformed into silver sulfate, the copper being partly (but in relatively small proportion) in the form of oxid and partly (but in relatively large proportion) in the form of sulfate.

I have, however, found (and this discovery forms the subject matter of the present application) that I can effect a considerable saving of sulfatizing agent, and possibly of fuel (sufficient to affect to a marked extent the final cost of the operation) by conducting the sulfatizing roast at a temperature of about 450° C. until an analytical test or experience shows that substantially all the copper has been oxidized, and then raising the temperature to above 600° C., and not exceeding 750° C., and continuing the roast at such high temperature until about 90% or more of the silver, and about 10% of the copper, have been converted into water-soluble form, that is, into their respective sulfates. At such higher temperature the copper very readily gives up its sulfate radical to the silver, which, at the lower temperature of the initial stage of the roast, has not been sulfatized. The majority of the copper is thus left in the form of oxid in which it can be handled as readily, in the subsequent operations, as it can in the form of sulfate. Thus I do not consume any large quantity of my sulfatizing agent for the purpose of unnecessarily converting copper into copper sulfate, and effect a saving which may become of importance especially when the copper is refined in a locality in which pyrites, or some other inexpensive sulfatizing agent, is not readily available, and sulfuric acid must be used as the sulfatizing agent. While, in the subsequent operation, the copper oxid must be converted into copper sulfate by means of sulfuric acid, the acid used in such subsequent operation can be readily recovered or the copper sulfate disposed of without purification, for use as an article of commerce.

During the roasting operation the whole, or usually, a large part of, the selenium, a substantial fraction of the arsenic, and a small part or trace of the tellurium go off in gaseous form.

The further treatment of the roasted slime is substantially that described in my said application, Serial No. 259,852.

The roasted slime is now lixiviated preferably with water by which almost all of the silver together with a part of the copper and possibly traces of selenium, tellurium, arsenic and antimony are separated in soluble form from the solid residue containing the other water-insoluble constituents.

The thus produced silver solution may be treated in any known manner for the separation and removal of the silver and copper, that is, for the extraction of the metal values therein. For example, it may be treated so as to produce silver precipitated on copper in the form of silver cement.

The solid residue, above mentioned, resulting from the lixiviation with water is now lixiviated with a dilute acid, such as sulfuric acid, whereby there is produced a second solid residue containing the constituents insoluble in such acid, and a solution which contains substantially all of the copper content of the first solid residue, and, if sulfuric acid is used, a very small percentage of silver, a considerable proportion of the arsenic and tellurium, and possibly some selenium and antimony.

The second solution may be treated in any suitable manner for the extraction of its values. For example it may be treated to form cement silver and the copper sulfate solution made into blue vitriol, or electrolyzed to form electrolytic copper or passed over iron to form cement copper.

The second solid residue resulting from the acid treatment, containing all of the gold, platinum and palladium of the original mud and substantially no copper, may be subjected to any suitable treatment for the extraction of the gold. Preferably the gold is dissolved out by any gold solvent, in which case it is advantageous to use chlorin or a chlorin compound, such as aqua regia, which may be made from sulfuric acid, sodium nitrate and sodium chlorid. By this treatment practically all of the gold is obtained in the soluble form of gold chlorid. The gold solution may be treated, if desired, with a reducing agent, such as copperas or ferrous sulfate, or sulfur dioxid, to precipitate the gold in the form of metal which may be refined by conventional methods. If ferrous sulfate is used for this purpose the platinum and palladium present may be recovered in the manner described in my pending application, Serial No. 140,893, filed January 6, 1917. The residue resulting from the aqua regia treatment, which may be termed the third residue, contains small percentages of silver and gold, for example 1 to 3% of the silver of the original mud, mostly in the form of chlorid, and .75% of the original gold. This third residue may be returned directly to the smelter, or, if desired, may be treated with a solvent for silver, preferably sodium hyposulfite, thus dissolving practically all of the silver and a little of the gold. Such silver and gold may be recovered from the hyposulfite solution in any known way. The final residue resulting from the hyposulfite treatment is available for use in ore smelting or metal refining furnaces.

Instead of lixiviating first with water and then with acid, as described above, it may be advantageous in some cases, especially when the selenium, tellurium, arsenic and antimony contents of the original slime are relatively very small, to omit the water lixiviation and employ only the acid lixiviation. In this case the silver and copper are obtained as sulfates in the solution, and the solid residue is similar to the "second solid residue" above described. In either case the original mud or slime is roasted with a sulfatizing agent and then lixiviated with a solvent for certain of the ingredients of the sulfatized product.

The temperatures and the strengths of the various solutions and the time of treatment will, of course, vary with the different requirements, but such details of operation are well within the province of anyone skilled in the art. If no gold were present in the original mud the stage of the process dealing with gold would, of course, be omitted. If the second residue is substantially free from silver and copper, the chlorin treatment might be omitted and the residue subjected to refining merely.

I claim:

1. The herein described process of treating electrolytic slimes which comprises subjecting such slimes to a roasting operation in the presence of a sulfatizing agent at such a temperature and with such a proportion of sulfatizing agent that substantially all of the silver and as little as possible of the copper are converted into sulfates.

2. The herein described process of treating slimes containing gold, silver and copper, which comprises subjecting such slimes to a roasting operation in the presence of a sulfatizing agent at such a temperature, and with such a proportion of sulfatizing agent that substantially all of the silver, and as little as possible of the copper, are converted into sulfates, treating the roasted slime with a solvent for the silver and copper sulfates, whereby a soluble portion containing silver and copper, and an insoluble portion containing the gold, are produced, and extracting the metal values from the soluble and insoluble portions.

3. The herein described process of treating electrolytic slimes which comprises subjecting such slimes to a roasting operation in the presence of a sulfatizing agent until substantially all of the copper has been converted into copper sulfate and then continuing the sulfatizing roast at a higher temperature until substantially all of the silver has been converted into silver sulfate, the proportion of sulfatizing agent being such that as the silver sulfate is being formed the copper sulfate is converted into copper oxid.

4. The herein described process of treating electrolytic slimes which comprises subjecting such slimes to a roasting operation in the presence of a sulfatizing agent until substantially all of the copper has been converted into copper sulfate and then continuing the sulfatizing roast at a higher temperature until substantially all of the silver has been converted into silver sulfate, the proportion of sulfatizing agent being such that as the silver sulfate is being formed the copper sulfate is converted into copper oxid, and then treating the roasted slime with a solvent for the silver and copper sulfates and extracting the metal values from the soluble and insoluble portions.

In testimony whereof I have hereunto set my hand.

WILLIAM C. FERGUSON.